Sept. 19, 1950  S. E. WESTMAN  2,522,913
PRESSURE REDUCING VALVE
Filed Jan. 21, 1946

INVENTOR.
SYDNEY E. WESTMAN
BY
ATTORNEY

Patented Sept. 19, 1950

2,522,913

UNITED STATES PATENT OFFICE 2,522,913

PRESSURE REDUCING VALVE

Sydney E. Westman, Los Angeles, Calif., assignor to Bendix Aviation Corporation, South Bend, Ind., a corporation of Delaware Application January 21, 1946, Serial No. 642,576

3 Claims. (Cl. 50—11)

This invention relates to pressure reducing valves adapted to be connected between a high pressure line and a low pressure line, and to maintain a predetermined pressure in the low pressure line by controlling the flow thereto from the high pressure line. The valves of the present invention are particularly adapted for use in hydraulic power systems, although they are not restricted to such use.

An object of the invention is to provide a reliable and quiet pressure reducing valve.

Another object is to provide a pressure reducing valve that also functions as a relief valve to relieve excessive pressures that may be developed in the low pressure line from various causes.

Another object is to provide a pressure reducing valve of pilot-type, that is capable of handling large flows without requiring the use of extremely large balancing springs.

Another object is to provide a pressure reducing valve construction such that the valve can be changed from a pilot-type valve to a non-pilot type valve, or vice versa, by the interchange of a relatively few parts.

Another object is to provide a pilot type pressure reducing valve of particularly simple construction.

Other advantages and features of the invention will become apparent from the detailed description to follow, with reference to the drawing; in which.

Figure 1:
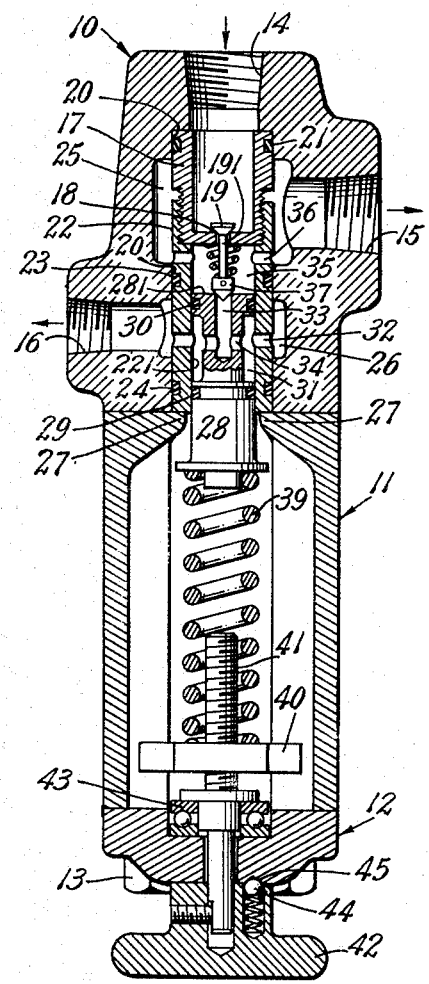
Fig. 1 is a longitudinal sectional view through a non-pilot type pressure reducing valve in accordance with the invention.

Referring to Fig. 1, the valve therein disclosed has a casing consisting of a body 10, a spring housing 11, and an end closure cap 12 for the housing 11. The three parts may be joined together by long screws 13, which extend through the closure cap 12, and are threaded into the body 10.

The body 10 has a high pressure port 14, a low pressure port 15, and a relief port 16. The high pressure port 14 may be connected to a source of fluid at high pressure, and the port 15 may be connected to a system which is to be supplied with fluid at a constant pressure lower than the pressure of the fluid supplied to port 14. The relief port 16 may be vented to the atmosphere or to a reservoir from which fluid is supplied by a pump to the high pressure port 14.

The high pressure port 14 is connected to the open end of a cup-shaped member 17, having a valve seat 18 in its bottom end, through which fluid is supplied to the low pressure port 15, under the control of a poppet valve 19. The cup-shaped member 17 is sealed at its upper end with respect to a bore 20 in the body 10, by a sealing ring 21. The lower exterior surface of the cup-shaped member 17 is threaded and screwed into the upper end of a sleeve 22, which is fitted in the bore 20 of the body 10, and is sealed with respect thereto by a pair of annular seals 23 and 24.

The bore 20 of the body 10 is enlarged intermediate the seals 21 and 23 to define an annular chamber 25, which is connected to the low pressure port 15, and the bore 20 is enlarged intermediate the seals 23 and 24 to define an annular chamber 26 connected to the relief port 16. The cup-shaped member 17 and the sleeve 22, connected to it, are retained in position in the bore 20 by inwardly extending shoulders 27 on the spring housing 11. The sleeve 22 defines a bore containing a piston 28, which is sealed with respect to the bore by spaced sealing rings 29 and 30. The piston 28 is recessed intermediate the sealing rings 29 and 30 to define with the bore 221 of the sleeve, an annular chamber 31, which is connected by radial passages 32 in the sleeve, to the chamber 26. The piston 28 has an axial passage 33 extending therethrough from the upper end, and connected to the chamber 31 by radial passages 34. The upper end of the piston 28 defines with the bore 221 and the lower end of the member 17, a chamber 35, which is connected by radial passages 36 in the sleeve 22 to the chamber 25.

The poppet 19 has a stem 191, on the lower end of which there is an auxiliary poppet 37, which is adapted to close the upper end of the piston passage 33.

The piston 28 is constantly urged upwardly by a helical compression spring 39, which is compressed between the lower end of the piston 28 and a spring loading member 40, which is slidable but not rotatable in the spring housing 11, and is threaded on to a screw 41, which extends through the end cap 12 and has a handle 42 on its outer end. A thrust bearing 43 is provided in the end cap 12 to take the thrust of the screw. The handle 42 may be provided with a spring-pressed ball detent 44, adapted to engage in one or more recesses 45 in the outer surface of the end cap 12 to retain the handle in a position of adjustment to which it has been moved.

The valve of Fig. 1 operates as follows: The valve is shown in closed position, in which the poppet 19 is closing the seat 18 so that no fluid can enter through the high pressure port 14, and the poppet 37 is closing the end of the passage 33 so that no fluid can escape from the low pressure port 15 to the relief port 16. This condition will persist as long as the pressure in the low pressure port 15 remains at a predetermined value, so that the force it exerts on the upper annular end face 281 of the piston 28 balances the force of the loading spring 39.

If the pressure in the port 15 drops below the predetermined value, the spring 39 moves the piston 28 upwardly, thereby opening the poppet 19 to permit fluid flow from the high pressure port 14 through the seat 18, the chamber 35, and the passages 36 to the chamber 25 and the low pressure port 15, and the valve will open sufficiently to maintain the pressure in the chamber 35 very near the predetermined value.

When the pressure in the low pressure port 15 returns to the desired value, this pressure acting on the piston face 281 moves the piston downward, permitting the poppet 19 to close and stop the flow from the high pressure port 14. Should the pressure in the low pressure port 15 continue to rise after the poppet 19 has closed, the piston 28 will be moved away from the auxiliary poppet 37, permitting fluid to be vented from the low pressure port 15 through the passages 36, the chamber 35, the passages 33 and 34, the chamber 31, the passages 32, and the chamber 26 to the relief port 16. This eliminates the need of providing a separate relief valve in the low pressure line to prevent excessive rise of pressure therein.

It is to be noted that there is a definite difference between the pressure in the chamber 35 which permits opening of the poppet 19, and the pressure required to open the auxiliary poppet 37. Thus, before the poppet 19 can open, the force of the spring 39 must overcome not only the fluid pressure force acting against the annular face 281 of the piston, but also the force of the fluid pressure in chamber 35 against the auxiliary poppet 37, and the difference in force between the high pressure fluid in port 14 and low pressure fluid in chamber 35 acting against the poppet 19. However, during closing movement, following seating of the poppet 19, and opening of the auxiliary poppet 37, the fluid forces acting on the poppet 19 and the auxiliary poppet 37 are no longer effective against the piston 28, and the sole fluid force effective to move the piston is then that of the pressure fluid acting against the annular face 281. Hence the pressure in the low pressure port 15 must increase by a definite margin following closure of the poppet 19 before the auxiliary poppet 37 opens.

In order to make the operation of the valve of Fig. 1 relatively independent of variations in the pressure in the high pressure port 14, the area of the seat 18 against which the poppet 19 seats must be kept relatively small, since the spring 39 must overcome not only the forces resulting from the fluid pressure in the chamber 35, but also the force of the high fluid pressure against the poppet 19. Furthermore, if the poppet 19 and seat 18 are made very large, to increase the flow capacity of the valve, and the diameter of the piston 28 is increased proportionately, the spring 39 must be made larger to overcome the large force of the high pressure fluid acting against the poppet 19 and the low pressure fluid acting against the piston face 281. This limitation of the valve construction shown in Fig. 1 can be removed by modifying the valve as shown in Fig. 2, which utilizes a small pilot valve to control the opening of a relatively large main valve.

Figure 2:
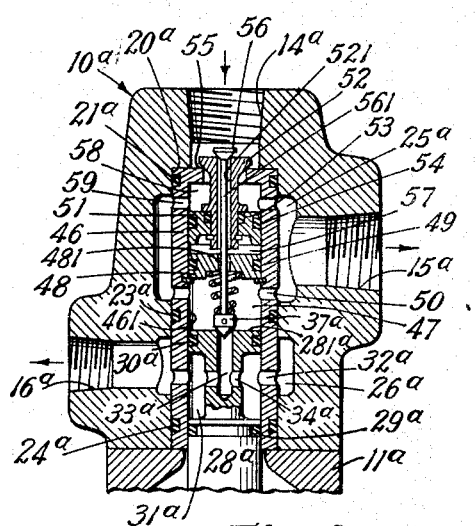
Fig. 2 is a longitudinal sectional view of a portion of Fig. 1 showing the valve adapted for pilot operation.

Referring to Fig. 2, the body 10a corresponds exactly to the body 10 of Fig. 1, and corresponding parts bear the same reference numerals with the suffix "a." The spring housing 11a and the parts therein, and the piston 28a are identical with the corresponding parts in Fig. 1. However, the sleeve 22 and the cup-shaped receptacle 17 of Fig. 1 are replaced in Fig. 2 by a single sleeve 46, which is sealed with respect to the bore 20a by three sealing rings 21a, 23a, and 24a.

The piston 28a seals in the lower end of the sleeve 46 and defines therewith a chamber 31a, corresponding to the chamber 31 of Fig. 1, which is connected by ports 32a to the chamber 26a and a relief port 16a. This chamber 31a is also connected by passages 34a and 33a in the piston to a chamber 47, defined by a bore 461 of the sleeve 46, between the piston 28a and a partition 48, which is sealed with respect to the bore 461 by a seal 49. The chamber 47 is communicated by radial passages 50 with the chamber 25a and the low pressure port 15a.

Positioned within the upper end of the bore 461 is a piston 51, which is secured to a main poppet 52 for movement therewith, and is sealed with respect to the poppet by a sealing ring 53, and with respect to the bore 461 by a sealing ring 54. The poppet 52 closes against a relatively large seat 55 in the upper end of the sleeve 46.

The main poppet 52 has an axial passage 521 extending therethrough, the upper end of which is adapted to be closed by a pilot poppet 56, which has a long stem 561 extending through the passage 521 and through passage 481 in the partition 48, and which supports on its lower end an auxiliary poppet 37a. The stem 561 has substantial clearance with the main poppet passage 521, but less clearance with the passage 481.

The pilot valve of Fig. 2 operates as follows: When the pressure in the low pressure port 15a is at a predetermined value, in which all three of the poppets 37a, 56, and 52 are seated, the low pressure port 15a is disconnected from both the high pressure port 14a and the relief port 16a.

If the pressure in the low pressure port 15a drops, the pressure force acting against the face 281a of the piston 28a drops, permitting the piston to be moved upwardly by its loading spring. This opens the pilot poppet 56, permitting high pressure fluid to flow therepast through the passage 521 and into a chamber 57 between the main poppet piston 51 and the partition 48. Some leakage of fluid from the chamber 57 occurs through the clearance between the stem 561 and the passage 481 to the chamber 47, but the pressure drop across the passage 481 resulting from such leakage flow will be large as compared to the pressure drop across the passage 521, so that the pressure in the chamber 57 rises. This rising pressure in chamber 57 acting against the underside of the piston 51 overcomes the force of the low pressure in the chamber 58 above the piston 51, and the high pressure in the port 14a acting against the main poppet 52, thereby opening the main poppet and permitting fluid to flow therepast into the chamber 58 and through radial passages 59 in the sleeve 46 into the chamber 25a and the low pressure port 15a, and maintain the desired pressure in the low pressure port. It will be noted that in order for the piston 28a to be moved upwardly by its spring, it is necessary only that the spring overcome the force of the low pressure fluid in the chamber 47 acting on the annular piston face 281a and the auxiliary poppet 37a, and the force of the high pressure fluid in port 14a acting against the pilot poppet 56. The pilot poppet can be made sufficiently small so that the force developed thereagainst by the high pressure fluid is not serious.

When the pressure in the low pressure port 15a rises, the piston 28a is moved downwardly, causing the pilot poppet 56 to approach its seat, thereby throttling fluid flow to, and reducing the pressure in, the chamber 57, permitting the piston 51 and the main poppet 52 to move downwardly until the main poppet seats.

If the pressure in the low pressure port 15a continues to rise further, the piston 28a will be moved downwardly to open the auxiliary poppet 37a, and permit the escape of fluid from the low pressure port through the passages 50, chamber 47, passages 33a and 34a, the chamber 31a and the passages 32a and 26a and the relief port 16a, until the excess pressure is dissipated, whereupon the piston 28a will again rise to close against the auxiliary poppet 37a.

It will be observed fluid escaping from the chamber 57 between the stem 561 and the passage 481 flows through the chamber 47 and the passage 50 to the chamber 25a connected to the low pressure port 15a. If desired, this fluid can escape past the poppet piston 51 into the chamber 58 and thence through the passages 59 to the chamber 25a. This permits the elimination of the sealing ring 54 and the frictional resistance to movement of the piston that is caused by the sealing ring. Where the fluid is permitted to escape past the piston 51, it may in some instances be desirable to provide a sealing ring between the stem 561 and the passage 481.

The relative dimensions of the parts in Fig. 2 must be properly chosen relative to the pressures that are to be handled. Obviously, in order for the piston 51 to open the main poppet 52, the piston must have an area such that the force developed against the underside of the piston by high pressure fluid in the chamber 57 will be greater than the force exerted against the upper side of the piston by the low pressure fluid in the chamber 58 plus the differential force exerted against the main poppet 52 by the high pressure fluid in the port 14a and the low pressure in chamber 58. When the values of the high pressure in the port 14a and the desired low pressure in the port 15a are known, the dimensions of the main poppet 52 and the piston 51 can be readily calculated.

Figure 3:
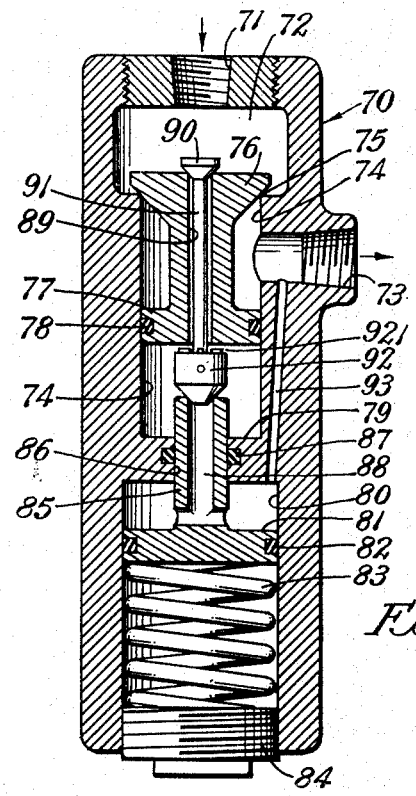
Fig. 3 is a longitudinal section showing an alternative construction of pilot type pressure reducing valve in accordance with the invention.

There is shown in Fig. 3 a pressure reducing valve of the pilot type, in which the main valve is controlled by a pilot valve in a different manner from that involved in the construction of Fig. 2. Referring to Fig. 3, there is shown a tubular body 70 having a high pressure port 71 at one end feeding into a chamber 72, and a low pressure port 73 extending through the side of the body and communicating with a longitudinal bore 74. The upper end of the bore 74 constitutes a poppet valve seat 75, communicating the bore with the chamber 72, and normally closed by a main poppet 76, which is formed integrally with a piston 77, which is sealed with respect to the bore 74 by a sealing ring 78. The piston 77 is located below the low pressure port 73. The lower end of the bore 74 is closed by a wall 79, which separates the bore 74 from a larger bore 80, which extends into the body 70 from the lower end. A piston 81 is fitted in the bore 80 and sealed with respect thereto by a sealing ring 82. A helical loading spring 83 is compressed between the underside of a piston 81 and a screw plug 84, which is threaded into the lower end of the bore 80 and provides for adjustment of the loading of the spring 83.

The piston 81 has a piston rod 85 extending upwardly therefrom through a passage 86 in the wall 79 into the bore 74, and sealed with respect to the passage 86 by a sealing ring 87. This piston rod 85 has an axial passage 88 extending from its upper end and communicating with the bore 80 above the piston 81.

The main poppet 76 has an axial passage 89 extending therethrough, and the upper end of this passage is adapted to be closed by a pilot poppet 90, having a stem 91 which extends through the passage 89, and is secured to an auxiliary poppet 92 at its lower end. The auxiliary poppet 92 is adapted to close the upper end of the passage 88 in the piston rod 85. Opening movement of the pilot poppet 90 with respect to the main poppet 76 is limited to a small value by engagement of projections 921 on the upper end of the auxiliary poppet 92 with the lower end of the main poppet 76. The low pressure port 73 is permanently connected to the upper end of the bore 80 by a fluid passage 93.

The valve of Fig. 3 functions as follows: Assume that the pressure in the low pressure port 73 is at a desired predetermined value, and that a source of pressure fluid of higher pressure is connected to the high pressure port 71. The pressure in the low pressure port 73 is applied through the passage 93 to the upper end of the bore 80, where it is applied to the upper face of the piston 81 and develops a force thereagainst which is balanced by the loading spring 83. The pilot poppet 90 is seated against the upper end of the passage 89 by the high pressure fluid in the chamber 72, and the auxiliary poppet 92 is seated against the upper end of the passage 88, so that the lower end of the bore 74 is a closed chamber.

Now assume that as the result of withdrawal of fluid from the low pressure port 73, the pressure in the upper end of the bore 80 diminishes, permitting the loading spring 83 to move the piston 81 upwardly. This causes the piston rod 85 to carry the auxiliary poppet 92 upwardly, thereby opening the pilot valve 90, until the projections 921 thereon contact the piston 77. Prior to opening of the pilot valve 90, the force of the high pressure fluid in the chamber 72 acting against the large main poppet 76 held the latter firmly seated. However, as soon as the pilot valve 90 is cracked, high pressure fluid from the chamber 72 is admitted through the passage 89 to the lower end of the bore 74, thereby balancing the force of the pressure fluid acting against the main poppet 76 with an equal force produced by fluid at the same pressure acting against the underside of the piston 77. The loading spring 83 is then able to easily lift the main poppet 76, and it moves upwardly to admit pressure fluid from the chamber 72 into the low pressure port 73 in sufficient volume to maintain the desired pressure in the port 73.

When the pressure in the low pressure port 73 rises above the predetermined range, this pressure acting against the piston 81 moves it downwardly, permitting the pilot poppet 90 to close the upper end of passage 89, after which further downward movement of the piston 81 and its rod 85 carries the latter away from the auxiliary poppet 92, permitting the pressure fluid to be exhausted from the underside of the piston 77 through the passage 88, the upper end of the bore 80 and the passage 93, to the low pressure port 73. Thereupon, the high pressure in the chamber 72 closes the main poppet 76.

The speed with which the main poppet 76 responds to variations in pressure in the low pressure port 73 depends upon the size of the passage 89 through which pressure fluid is admitted to the underside of the piston 77, and the size of the passage 88 through which pressure fluid is vented from the underside of the piston 77. By suitably proportioning the passages 89 and 88, any desired speed of response of the main poppet 76 can be obtained.

The rate at which pressure fluid is admitted from the chamber 72 to the underside of the piston 77 can also be controlled by limiting the opening movement of the pilot poppet 90. It is usually desirable to provide only minute clearance between the projections 921 of the auxiliary poppet 92 and the underside of the piston 77, to permit the pilot poppet 90 to barely crack.

It will be observed that during the period of increase in pressure in the low pressure port 73 and the upper end of the bore 80, the auxiliary poppet 92 will follow the piston rod 85 very closely, because the slightest cracking of the auxiliary poppet 92 away from the piston rod permits escape of pressure fluid from the lower end of the bore 74 and resultant following movement of the piston 77 and main poppet 76.

Although for the purpose of explaining the invention, several different modifications thereof have been described in detail, several distinctions from the exact construction shown will be apparent to those skilled in the art and the invention is therefore to be limited only to the extent set forth in the appended claims.

Divisional application Serial No. 26,432 was filed May 11, 1948 claiming the specific construction shown in Fig. 3.

I claim:

1. In a pressure reducing valve: a body member having a longitudinal passage therein; a high pressure port communicating with one end of said body passage; a relief port communicating with said body passage at a point longitudinally spaced from said one end; a low pressure port communicating with said body passage at a point intermediate said high pressure port and said relief port; a sleeve positioned in said body passage, and means sealing it with said body passage at a zone intermediate said high pressure port and said low pressure port, and at a zone intermediate said low pressure port and said relief port; a lateral low pressure port in said sleeve communicating the interior of the sleeve with said low pressure port in said body member; a lateral relief port in said sleeve communicating the interior of the sleeve with said relief port in said body member; an axial valve seat in said sleeve communicating said high pressure port with said lateral low pressure port; a poppet seating against the high pressure end of said seat; a piston in said sleeve juxtaposed to said lateral relief port therein, and having sealing means sealing with said sleeve at zones before and beyond said relief port, and having an axial passage extending into said piston from the high pressure end thereof and communicating with said lateral relief port; an auxiliary poppet in axial alignment with said first mentioned poppet, and adapted to seat against the end of said axial piston passage, the said piston and auxiliary poppet sealing said sleeve intermediate said low pressure port and said relief port when said auxiliary poppet is seated against said piston passage; spring means urging said piston toward said high pressure end; and means responsive to movement of said auxiliary poppet by said piston toward said high pressure end for unseating said first mentioned poppet to admit fluid from said high pressure port to said low pressure port.

2. A valve as described in claim 1 in which said last mentioned means comprises: a stem interconnecting said first mentioned poppet and said auxiliary poppet.

3. A valve as described in claim 1 in which said last mentioned means comprises: a partition within said sleeve; a second piston sealing with said sleeve between said partition therein and said lateral low pressure port; means connecting said second piston with said first mentioned poppet for actuating the latter; a poppet passage extending through said second piston and said first mentioned poppet; a pilot poppet seating against the outer end of said poppet passage; a stem interconnecting said pilot poppet and said auxiliary poppet, and extending through said poppet passage and through an axial passage provided therefor in said partition; said sleeve having a lateral port communicating said low pressure port with the interior of said sleeve intermediate said partition and said first piston; said stem having less clearance with the passage in said partition than with said poppet passage, whereby opening of said pilot poppet develops a pressure between said partition and said second piston sufficient to open said first mentioned poppet against the force of the pressure fluid in said high pressure port.

SYDNEY E. WESTMAN.

REFERENCES CITED

The following references are of record in the file of this patent:

UNITED STATES PATENTS

| Number | Name | Date |
|---|---|---|
| 650,724 | Metzger | May 29, 1900 |
| 1,180,108 | Cash | Apr. 18, 1916 |
| 1,611,079 | Roschanck | Dec. 14, 1926 |
| 1,995,826 | Soderberg | Mar. 26, 1935 |
| 2,044,452 | Terry | June 16, 1936 |

FOREIGN PATENTS

| Number | Country | Date |
|---|---|---|
| 1,747 | Great Britain | Jan. 26, 1893 |
| 724,263 | France | Jan. 26, 1932 |